United States Patent
Yang et al.

(10) Patent No.: US 9,694,536 B2
(45) Date of Patent: Jul. 4, 2017

(54) SYSTEM AND METHOD FOR EMBOSSING THE WIRE SIDE OF A MOLDED FIBER ARTICLE

(71) Applicant: Huhtamaki, Inc., De Soto, KS (US)

(72) Inventors: Keegan Y. Yang, Winslow, ME (US); Donald V. Breton, N. Vassalboro, ME (US); James Michaud, Albion, ME (US)

(73) Assignee: HUHTAMAKI, INC., De Soto, KS (US)

( * ) Notice: Subject to any disclaimer, the term of this patent is extended or adjusted under 35 U.S.C. 154(b) by 114 days.

(21) Appl. No.: 14/546,835

(22) Filed: Nov. 18, 2014

(65) Prior Publication Data
US 2015/0140288 A1    May 21, 2015

Related U.S. Application Data

(60) Provisional application No. 61/905,671, filed on Nov. 18, 2013.

(51) Int. Cl.
| | |
|---|---|
| *B29C 59/02* | (2006.01) |
| *D21J 7/00* | (2006.01) |
| *B65D 1/34* | (2006.01) |
| *B29L 31/00* | (2006.01) |
| *B29C 33/42* | (2006.01) |
| *B65D 85/30* | (2006.01) |
| *B29C 33/10* | (2006.01) |

(52) U.S. Cl.
CPC ............... *B29C 59/02* (2013.01); *B65D 1/34* (2013.01); *B29C 33/10* (2013.01); *B29C 33/428* (2013.01); *B29L 2031/772* (2013.01); *B65D 85/30* (2013.01); *B65D 2203/12* (2013.01); *Y10T 428/24802* (2015.01)

(58) Field of Classification Search
CPC ........ D21J 7/00; D21J 3/00; D21J 3/10; D21J 5/00; B29C 33/10; B29C 33/428; B29C 59/02; B65D 1/34; B65D 2203/12; B65D 85/30; Y10T 428/24802
See application file for complete search history.

(56) References Cited

U.S. PATENT DOCUMENTS

| | | | | |
|---|---|---|---|---|
| 2,475,375 A | * | 7/1949 | Clark | ............... B44C 3/046 264/108 |
| 3,016,090 A | * | 1/1962 | Chaplin | ............... D21J 7/00 162/385 |

(Continued)

*Primary Examiner* — Jose Fortuna
(74) *Attorney, Agent, or Firm* — Husch Blackwell LLP (57) ABSTRACT

A system and method for constructing a molded fiber article capable of having detailed indicia embossed thereon is provided. A molded fiber article having a smooth surface with detailed indicia is also provided. The system includes using a wire mesh structure coupled with an embossing plate such that the embossing plate imparts a smooth surface with indicia onto the molded fiber article during formation. The smooth surface if the embossing plate allows for greater detail than that of the textured surface created by the wire mesh structure. The system may also include a forming die that generally conforms to the wire mesh structure to facilitate formation of the molded fiber article. The wire mesh structure may include a recessed area for housing the embossing plate, which may be attached to the wire mesh structure using fasteners and a backing plate.

16 Claims, 7 Drawing Sheets

(56) References Cited

U.S. PATENT DOCUMENTS

| | | | |
|---|---|---|---|
| 3,135,649 A * | 6/1964 | Foote | D21J 7/00 101/269 |
| 4,913,639 A | 4/1990 | Wheeler | |
| 5,626,802 A | 5/1997 | Slaughter, Jr. | |
| 6,254,814 B1 | 7/2001 | Ueda et al. | |
| 6,402,888 B1 | 6/2002 | Doublet et al. | |
| 6,479,128 B1 | 11/2002 | Schafernak et al. | |
| 6,623,851 B1 | 9/2003 | Kaplan et al. | |
| 6,716,319 B2 | 4/2004 | Gale et al. | |
| 7,879,280 B2 | 2/2011 | Randall et al. | |
| 8,012,309 B2 | 9/2011 | Paré et al. | |
| 2007/0096359 A1 | 5/2007 | Torfs et al. | |
| 2008/0169072 A1 | 7/2008 | Pare et al. | |
| 2010/0180781 A1 | 7/2010 | Foppapedretti | |
| 2010/0294448 A1 | 11/2010 | Pierce et al. | |
| 2011/0011549 A1 | 1/2011 | Pierce et al. | |
| 2011/0236638 A1 | 9/2011 | Ortega et al. | |
| 2011/0262765 A1 | 10/2011 | Yu et al. | |
| 2012/0091630 A1 | 4/2012 | Teague et al. | |
| 2013/0093125 A1 | 4/2013 | Furey et al. | |
| 2015/0007954 A1 * | 1/2015 | Huang | B65D 1/225 162/111 |
| 2015/0140288 A1 * | 5/2015 | Yang | B29C 59/02 428/195.1 |

* cited by examiner

SYSTEM AND METHOD FOR EMBOSSING THE WIRE SIDE OF A MOLDED FIBER ARTICLE

CROSS-REFERENCE TO RELATED APPLICATIONS

This Application claims priority to U.S. Provisional Patent Application Ser. No. 61/905,671, filed on Nov. 18, 2013, to Keegan Y. Yang et al. entitled "System and Method for Embossing the Wire Side of a Molded Fiber Article," currently pending, the entire disclosure of which is incorporated herein by reference.

BACKGROUND

Molded fiber products, manufactured with waste paper or other natural fibers, are well established in many food service and packaging applications, including plates, trays, bowls, egg cartons, clamshell containers, cup carriers, packaging for fragile items, packaging for household appliances and many other known items. For many applications, molded fiber is less expensive than plastic or foam packaging, and is often considered to be a more environmentally sustainable packaging material since it is typically produced from recycled materials and can be recycled again after its useful life-cycle.

One of the drawbacks to using molded fiber is the difficulty of molding fine details into products. In the process of manufacturing molded fiber products, fine mesh wires, perforated metal plates, or porous fabrics are used to remove water from the slurry of raw materials. For simplicity, these fine mesh wires, perforated metal plates, and porous fabrics will all be referred to herein as "wire mesh structures." The wire mesh structure leaves imprints on at least one side of the molded fiber article, referred to herein as the "wire side," giving a roughened surface, referred to herein as a "wire mark."

One of the techniques that can be used to customize the appearance of an article on the wire mark side involves pressing the wire mesh structure with a pattern or logo that will then be imprinted on the surface of the molded fiber article. However, only a coarse level of detail can be attained because the definition achievable by this technique is limited by the texture of the wire mesh structure.

Another technique that can be used to customize the appearance of an article involves drying the article in a mold, with wire mesh structure on one side, and a smooth heated die on the other side. The smooth heated die can contain a logo or other embossment, which will be transferred to the molded fiber article in high detail. The limitation of this technique is that it can only be applied to one face of an article. Wire mesh is still needed to evacuate water or steam from the opposite face of the article, leaving the characteristic wire mark, with its previously discussed limitations on detail.

Accordingly, a need exists for a system and method capable of embossing a sharp logo or other smooth ornamentation or indicia on the side of a molded fiber article that would normally have a rough texture imparted by a wire mesh structure. A need also exists for a molded fiber article that includes a sharp logo or other smooth ornamentation or indicia on a surface of the article that would normally have a rough texture imparted by a wire mesh structure.

SUMMARY OF THE INVENTION

The objective of the present invention is to provide a molded fiber article with an embossed logo or ornamentation in greater detail than presently available in the art. Another objective of the present invention is to provide a system and method for constructing a molded fiber article with an embossed logo or ornamentation in fine detail.

One embodiment of the present invention is directed toward a system for embossing indicia on a molded fiber article by providing a wire mesh structure coupled with an embossing plate having a surface with indicia such that the embossing plate provides smooth surface with detailed indicia for molding a logo or design in fine detail on a molded fiber article during formation. In one embodiment, the embossing plate is coupled to the wire mesh structure by way of fasteners and a backing plate. The wire mesh structure can include a recessed area for housing the embossing plate such that it creates a generally even surface on the molded fiber article.

The wire mesh structure and embossing plate can also be used in conjunction with a forming die during the fabrication of a molded fiber article. The forming die is a negative mold that conforms to the shape of the wire mesh structure and may contain vacuum ports for facilitating the evacuation of steam and water during the forming process. In one embodiment, the forming die includes a recessed portion for housing the backing plate to provide for a more conforming fit between the wire mesh structure and forming die. A second forming die, in the form of a positive mold, may also be used to provide a smooth surface on the interior side of the molded fiber article. The second forming die also conforms to the shape of the wire mesh structure.

The present invention is also directed towards a molded fiber article containing a smooth surface with a sharp, detailed logo or other indicia. In one embodiment, the molded fiber article is a carton with a base, sides and cover hingedly connected to one side. At least a portion of the cover includes a smooth surface created by the embossing plate. The smooth surface allows for finer detail logos or other indicia to be placed on the carton, which otherwise has a generally rough textured surface on the wire side of the molded fiber article created by the wire mesh structure.

Other aspects and advantages of the present invention will be apparent from the following detailed description of the preferred embodiments and the accompanying drawing figures.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to a system and method for impressing a sharp, detailed, and/or generally smooth logo, design, ornamentation or other or indicia onto a surface of a molded fiber article that would normally have a rough texture imparted by a wire mesh. The present invention is also directed generally to a molded fiber or molded pulp article having a sharp, detailed, and/or generally smooth logo, design, ornamentation or other indicia on a surface of the article that would normally have a rough texture imparted by a wire mesh during formation. In addition to providing a visually pleasing logo or indicia, the smooth surface created using the present invention may also be suitable for printing.

It will be appreciated that the system and method of the present invention may be used in connection with a thermoforming pulp molding machine, a reciprocating pulp molding machine, a rotary pulp molding machine or any other suitable pulp molding machine now known or hereafter developed.

Figure 1:
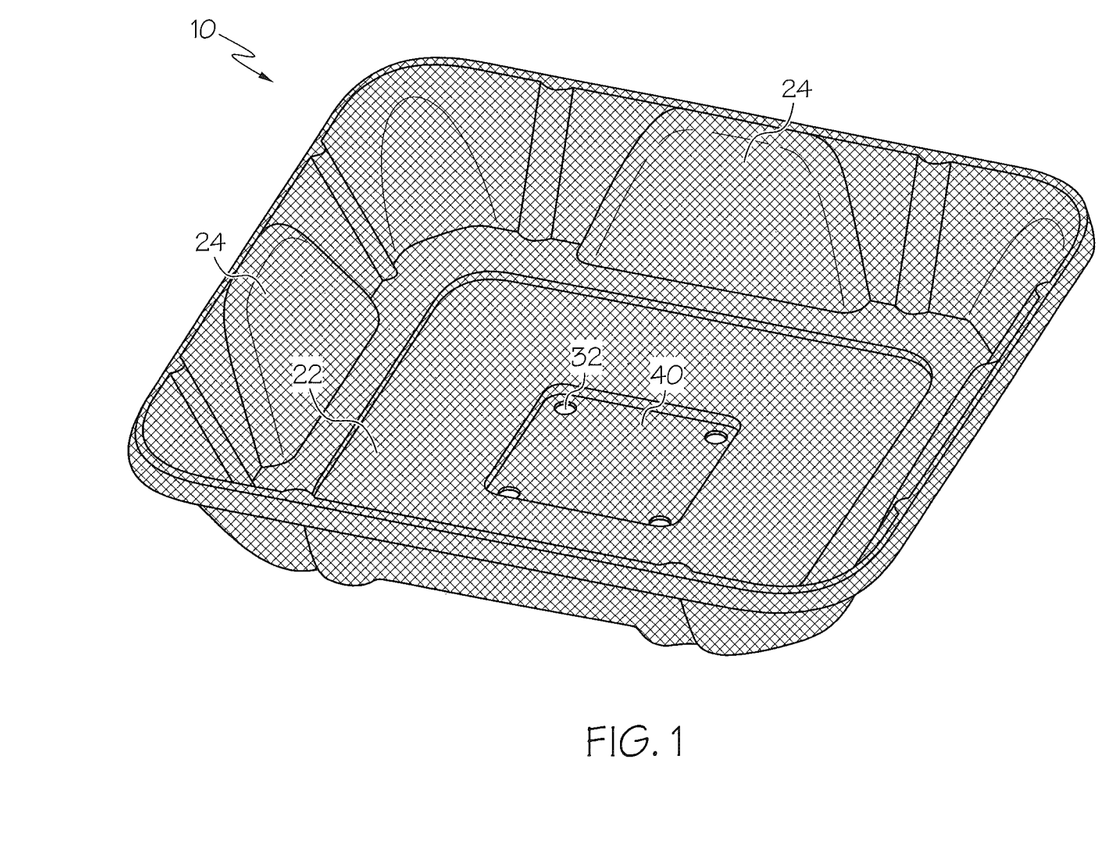
FIG. 1 is a top perspective view of a wire mesh structure with a recessed area to accommodate an embossing plate in accordance with one embodiment of the present invention.
Figure 2:
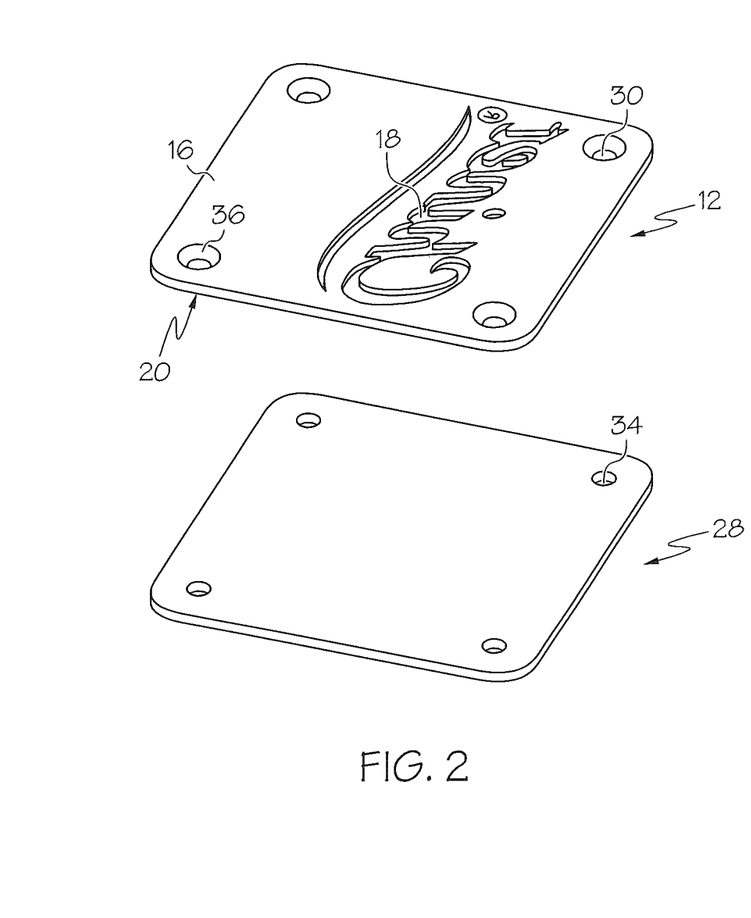
FIG. 2 is a top perspective view of an embossing plate and a backing plate in accordance with one embodiment of the present invention.

The system comprises of a mold that includes a wire mesh structure 10, as best shown in FIG. 1, coupled with an embossing insert or plate 12, as best shown in FIG. 2. The wire mesh structure 10 may be formed of fine mesh wires, perforated metal plates, porous fabrics or other structures, as represented by crosshatching in the figures, suitable for allowing water, moisture, and steam to be removed from the slurry of raw pulp material. The wire mesh structure 10 may be constructed of a suitable fabric, plastic, or metallic material, such as but not limited to, for example, stainless steel. As shown in FIG. 1, one embodiment of the wire mesh structure 10 includes a base 22 and surrounding sides 24 extending upwardly therefrom. The base 22 and each side 24 has an interior surface in which the molded article 50 is formed and an exterior surface opposite of the interior surface.

Figure 3:
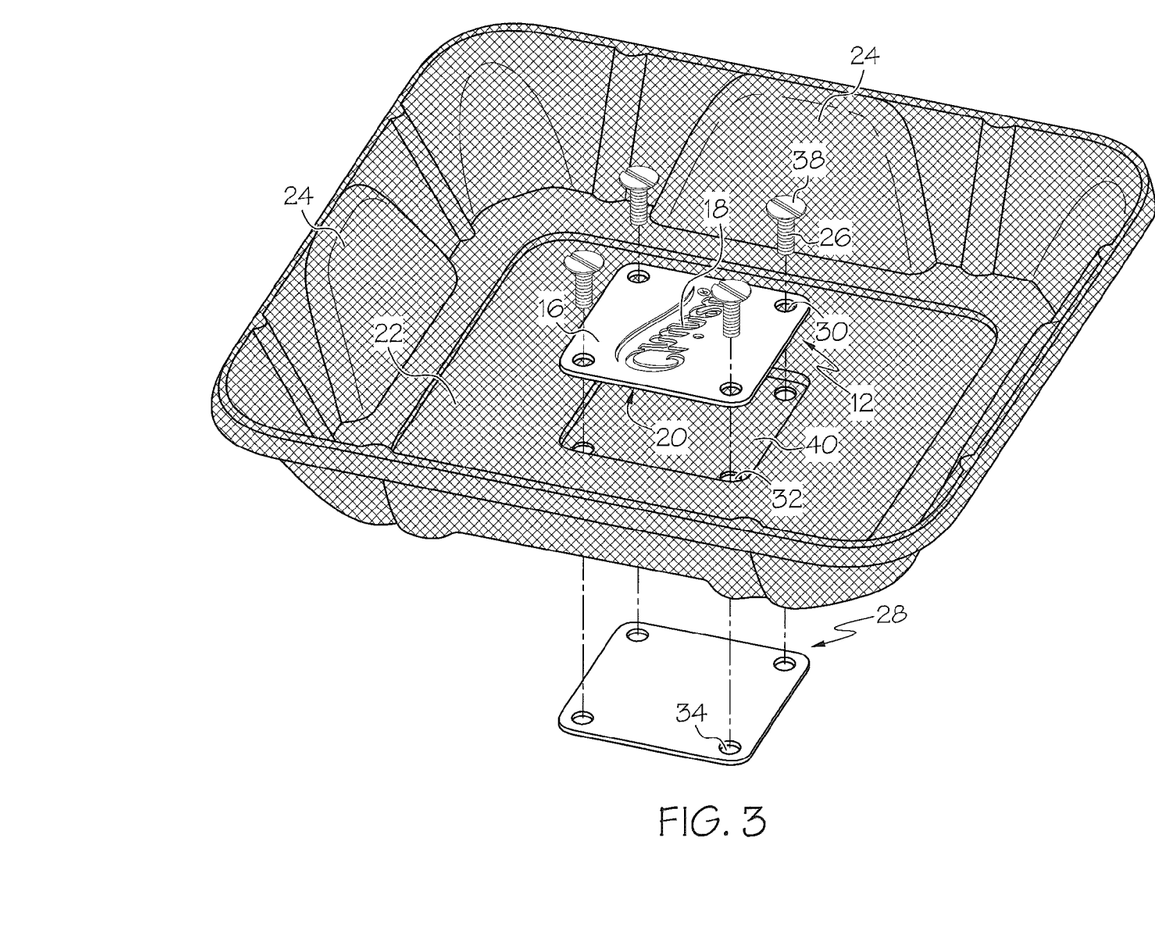
FIG. 3 is an exploded top perspective view of a wire mesh assembly, including a wire mesh structure, embossing plate, backing plate, and fasteners in accordance with one embodiment of the present invention.

Turning to FIG. 2, the embossing plate 12 may be constructed of bronze, aluminum, stainless steel, plastic or other material suitable for embossing a fiber or pulp material. In one embodiment, the embossing plate 12 may be formed from a solid material, such as solid metal or solid plastic. This allows for a generally uniform smooth surface 58 to be created on the formed molded fiber article 50. In this case, the embossing plate 12 is typically of a limited size in order to allow for the evacuation of water or steam through the wire mesh structure 10 around the edges of the embossing plate 12 as illustrated in FIG. 3. Therefore, it is understood that in another embodiment (not shown), the embossing plate 12 may be constructed of a solid material having slits, gaps, or other apertures within in order to allow for the evacuation of water, moisture, and/or steam through such apertures during formation of the molded fiber article 50 with a larger embossing plate 12. In yet another embodiment (not shown), the embossing plate 12 may be constructed of a porous material, such as sintered metal or sintered plastic, in order to allow a portion of the water or steam to be evacuated through the embossing plate 12. The embossing plate 12 may also take the form of any number of different shapes, such as a rectangular or circular shape. FIGS. 2 and 3 show an embodiment of the invention where the embossing plate 12 has a generally rectangular shape. However, it is recognized that any number of different shapes would be suitable for the embossing plate 12.

As shown in FIGS. 2 and 3, the embossing plate 12 has a top surface 16 that faces away from the wire mesh structure 10 when the embossing plate 12 and wire mesh structure 10 are coupled together. Top surface 16 may contain indicia 18, such as a logo, trademark, design, text, or other ornamentation. Such indicia 18 may be recessed into the top surface 16 and/or protruding from the top surface 16. When the indicia 18 is recessed into the top surface 16 of the embossing plate 12, a resulting raised indicia 60 is formed into the molded article 50. Conversely, when the indicia 18 protrudes from the top surface 16 of the embossing plate 12, a resulting indented indicia 60 is formed into the molded article 50. The top surface 16 of embossing plate 12 may comprise of a smooth surface as showing in FIG. 2, or it may comprise of a patterned surface or any other suitable surface formations. Additionally, the top surface 16 may be generally flat, as shown in FIG. 2, or it may have an uneven, sloped, wavy, stepped, beveled, or other form.

As also shown in FIGS. 2 and 3, the embossing plate 12 also has a bottom surface 20 opposite to its top surface 18. The bottom surface 20 faces toward the wire mesh structure 10 when the embossing plate 12 and the wire mesh structure 10 are coupled together. The bottom surface 20 may be a flat, smooth, textured, or any other suitable surface. For example, the bottom surface 20 may take on a form that facilitates attachment or coupling of the embossing plate 12 and the wire mesh structure 10.

The wire mesh structure 10 and embossing plate 12 may be coupled or attached in any suitable manner As best illustrated in FIG. 3, in one embodiment, the embossing plate 12 is coupled to the wire mesh structure 10 with fasteners 26, such as screws, bolts, rivets or any other suitable mechanical means, as shown in FIG. 3. In such an embodiment, the embossing plate 12 may be easily exchanged with another embossing plate, particularly if it is desired to mold different indicia 18 into the wire side of the molded article 50. In other embodiments, it is possible for the embossing plate 12 to be coupled to the wire mesh structure 10 by welding or with adhesive. In yet another embodiment, the bottom surface 20 of embossing plate 12 may be constructed such that it may clip on to, snap in to, magnetically attached with, or otherwise be secured to base 22 of the wire mesh structure 10. Finally, it is also understood that the embossing plate 12 and wire mesh structure 10 may be constructed as a single unit without using fasteners, attachments or other connections.

As depicted in FIG. 3, the embossing plate 12 may be coupled to the wire mesh structure 10 using a backing plate 28 and fasteners 26. As shown, the embossing plate 12 may include one or more apertures 30. The apertures 30 of embossing plate 12 may correspond to apertures 32 included in the wire mesh structure 10, and may also correspond to apertures 34 included in the backing plate 28. Apertures 30, 32, and 34 may be suitable for receiving fasteners 26 therethrough. Apertures 30 of the embossing plate 12 may include a chamfered edge 36 so that the head of a fastener 26 can be countersunk therein and the fastener's top surface 38 is generally flush with the top surface 16 of the embossing plate 12. Any or all of the apertures 30, 32, and 34 may be threaded in order to receive the threads of a screw.

Figure 5:
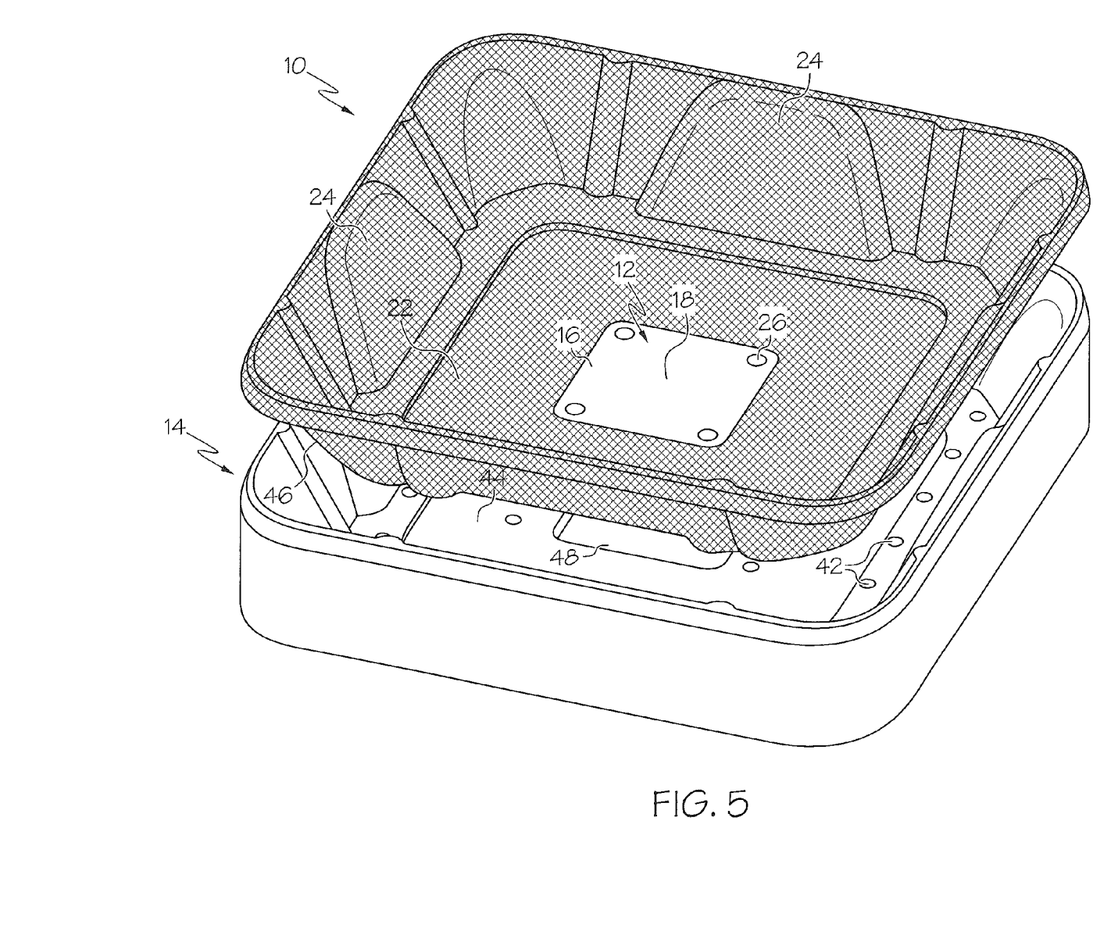
FIG. 5 is an assembled top perspective view of a wire mesh assembly being inserted into a vacuum forming die in accordance with one embodiment of the present invention.

As illustrated in FIGS. 1 and 3, the wire mesh structure 10 may have a recessed area 40 into which the embossing plate 12 can be received. The recessed area 40 may have a depth such that the top surface 16 of the embossing plate 12 is generally flush with a top surface of the wire mesh base 22, as shown in FIG. 5. Recessed area 40 may also have a depth greater than or less than the height of embossing plate 12 such that embossing plate 12 forms a design indentation or protrusion in the molded article 50 during formation. Apertures 32 of wire mesh structure 10 may be located in recessed area 40 allowing fasteners 26 to extend through embossing plate 12 and wire mesh structure 10.

Figure 4:
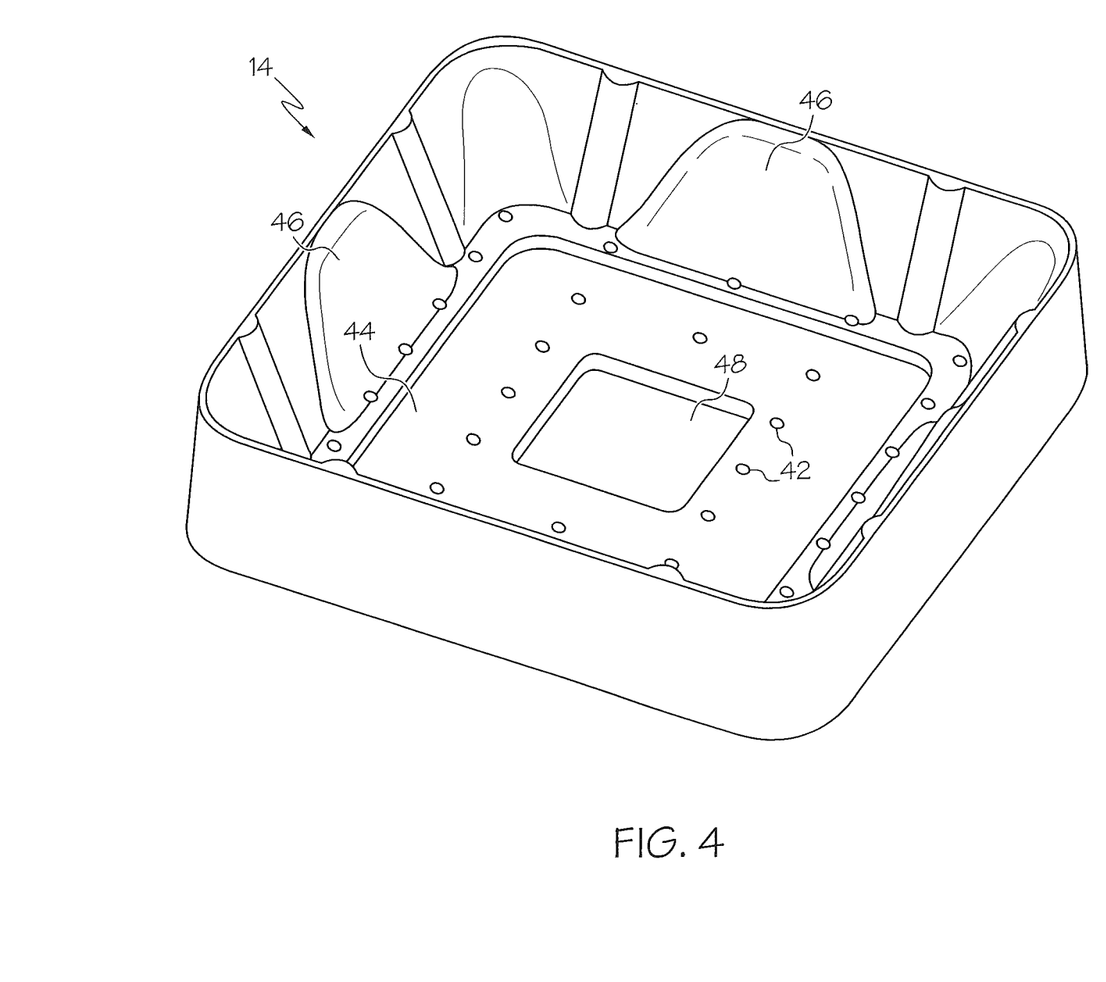
FIG. 4 is a partial top perspective view of a vacuum forming die with a recessed area to accommodate a backing plate in accordance with one embodiment of the present invention.

As illustrated in FIGS. 4 and 5, the present invention may be utilized in connection with a molding machine comprising a first forming die 14, a second forming die (not shown) and a wire mesh structure 10 covering the interior of the first forming die 14. The shape of the wire mesh structure 10 may generally correspond to the shape of the first forming die 14 and be adapted for securement thereto. The first forming die 14 and second forming die (not shown) may be constructed of bronze, aluminum, plastic or any other suitable materials.

As depicted in the embodiment shown in FIGS. 4 and 5, the first forming die 14 is a negative mold. As shown in FIG. 4, the first forming die 14 includes vacuum ports 42. When a negative pressure is applied via the vacuum ports 42, the first forming die 14 produces a suction that draws the pulp solution against the wire mesh structure 10. The base 22 and sides 24 of the wire mesh structure 10 correspond with a base 44 and sides 46 of the first forming die 14 as best illustrated in FIG. 5. As shown in FIG. 4, the base 44 of the first forming die 14 may include a recessed area 48 for accommodating a backing plate 28 (not shown in FIG. 4) used to secure the embossing plate 12 to the wire mesh structure 10 as illustrated in FIG. 5. In another embodiment, where a backing plate 28 is not used, the base 44 of the first forming die need not have a recessed area 48.

While not shown in the figures, the mold of the present invention can also include a second forming die. The second forming die can be a positive mold and may have a smooth surface in order to produce an article having a smooth surface opposite the relatively rough surface formed by the wire mesh structure 10. The second die can be utilized in a pressing operation wherein liquid is removed from the molded pulp article. The pressing operation can occur simultaneously with the suction operation. Heat may be added during the pressing and suction operations.

Figure 6:
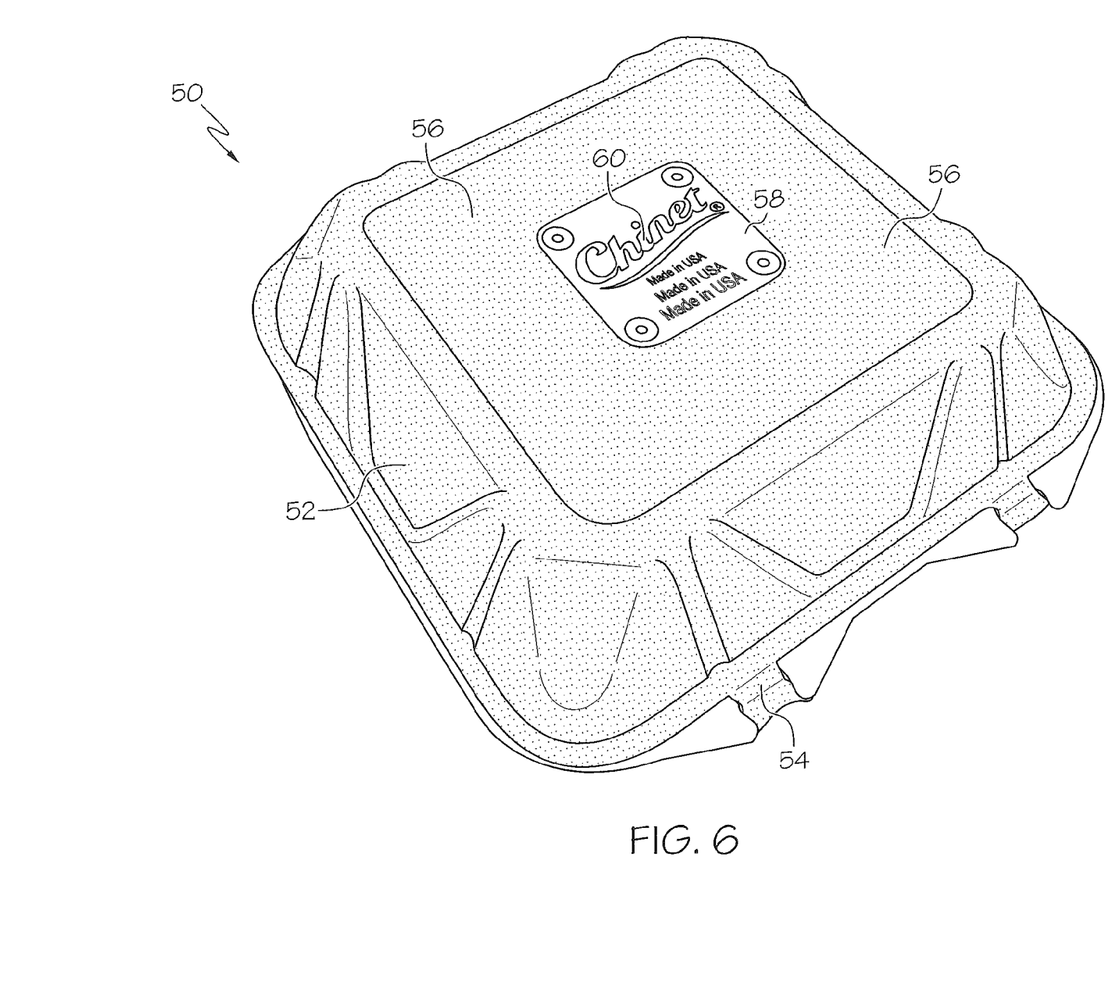
FIG. 6 is a top perspective view of a molded fiber article having a generally smooth embossment on the wire side thereof in accordance with one embodiment of the present invention.
Figure 7:
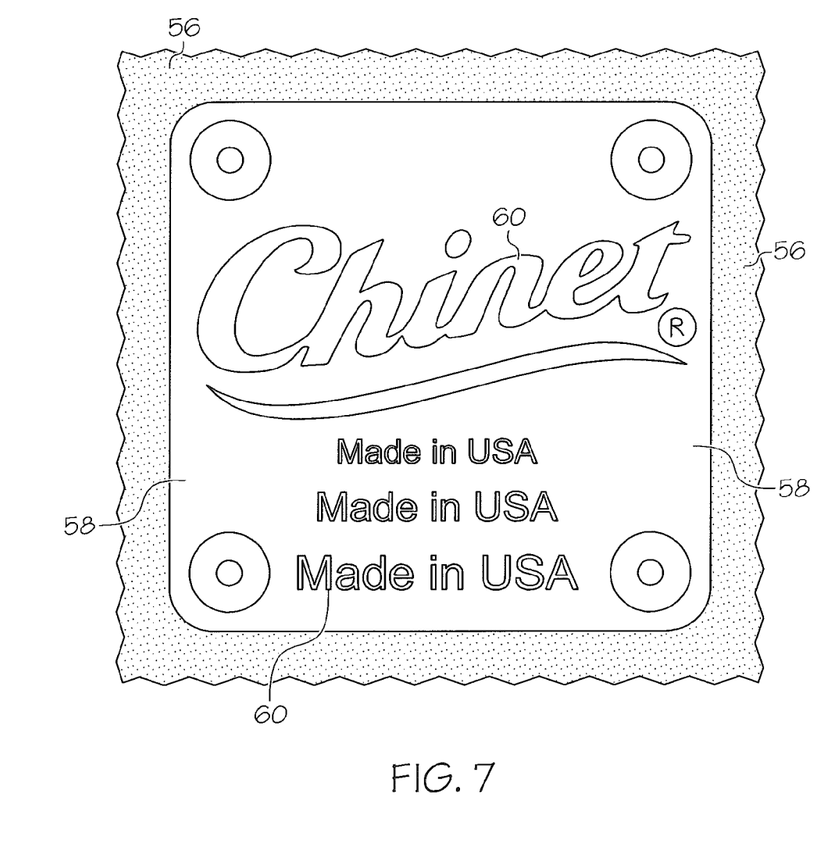
FIG. 7 is a partial plan view of a molded fiber article having a generally smooth embossment on the wire side thereof in accordance with one embodiment of the present invention.

The system and method of the present invention may be utilized in the manufacturing of any article 50 made of molded fiber products, including a contoured carton as shown in FIG. 6, cup carriers, plates, bowls, egg cartons, clamshell cartons, cups, containers, and other suitable packaging items and the like. The carton or article 50 illustrated in FIG. 6 includes a base (not shown) and a closable cover 52 integrally hinged thereto that may be locked in a closed position with locks 54. As demonstrated best in FIG. 7, the article 50 includes a surface 56 having wire marks, as represented by stippling in the figures, formed by the wire mesh structure 10 in the manufacturing process. In accordance with the present invention, the article 50 also includes a smooth surface 58 and indicia 60, as represented by the non-stippled areas, surrounded by the surface 56 having wire marks. The smooth surface 58 may be a flat uniform surface, as shown in FIG. 6. Alternatively, the smooth surface 58 may comprise of patterned, textured, or detailed surfaces. Additionally, the indicia 60 may be comprised of a logo, figure, design, or other ornamentation.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for embossing a molded fiber article, said system comprising:
   a wire mesh structure adapted for allowing removal of moisture from a material from which said molded fiber article is formed; and
   an embossing plate coupled to said wire mesh structure; wherein said embossing plate includes a face for producing indicia on an exterior surface of said molded fiber article.

2. The system of claim 1, wherein at least a portion of said face of said embossing plate comprises a smooth surface.

3. The system of claim 1, wherein said wire mesh structure comprises a base with a recessed area defined into said base, wherein said recess area has a shape conforming to a shape of said embossing plate and is configured for receiving at least a portion of said embossing plate.

4. The system of claim 3, wherein said recessed area has a depth substantially equal to a thickness of said embossing plate such that a top surface of said embossing plate is generally flush with a top surface of said base when said embossing plate is positioned within said recessed area.

5. The system of claim 1, wherein said embossing plate is fixedly connected to said wire mesh structure.

6. The system of claim 1 further comprising at least one fastener for coupling said embossing plate to said wire mesh structure.

7. The system of claim 6, wherein said embossing plate includes at least one aperture for receiving said at least one fastener.

8. The system of claim 1 further comprising a backing plate coupled with said wire mesh structure on a bottom side of said wire mesh structure.

9. The system of claim 8, wherein said backing plate includes at least one aperture for receiving at least one fastener.

10. The system of claim 9, wherein said at least one aperture of said backing plate is threaded for receiving threads of said at least one fastener.

11. The system of claim 1 further comprising of a first forming die having a base and sides generally conforming to a base and sides of said wire mesh structure for receiving at least a portion of said wire mesh structure.

12. The system of claim 11 further comprising a backing plate coupled with said wire mesh structure on a bottom side of said wire mesh structure, wherein said base of said first forming die includes a recessed area generally conforming to said backing plate for receiving at least a portion of said backing plate.

13. The system of claim 11 further comprising a second forming die, wherein said second forming die generally conforms to said wire mesh structure such that said second forming die may be at least partially received within said wire mesh structure opposite of said first forming die.

14. The system of claim 1, wherein said embossing plate includes indicia recessed on said face of said embossing plate.

15. The system of claim 1, wherein said embossing plate includes indicia protruding from said face of said embossing plate.

16. A system for embossing a molded fiber article, said system comprising:
a wire mesh structure having sides and a base, said wire mesh structure being adapted for allowing removal of moisture from a material from which said molded fiber article is formed;
an embossing plate coupled with a top surface of said base of said wire mesh structure;
a backing plate coupled with a bottom surface of said base of said wire mesh structure; and
a forming die generally conforming to said sides and base of said wire mesh structure for receiving at least part of said wire mesh structure;
wherein said embossing plate and said backing plate are coupled with said wire mesh structure by at least one fastener;
wherein said wire mesh structure has a recessed area within said base of said wire mesh structure generally conforming to said embossing plate for receiving at least part of said embossing plate;
wherein said embossing plate includes a face for producing indicia on an exterior surface of said molded fiber article, wherein at least a portion of said face includes a generally smooth surface.

* * * * *